May 8, 1928.
J. H. WIGGINS
METER
Filed May 31, 1922
1,669,315
3 Sheets-Sheet 1
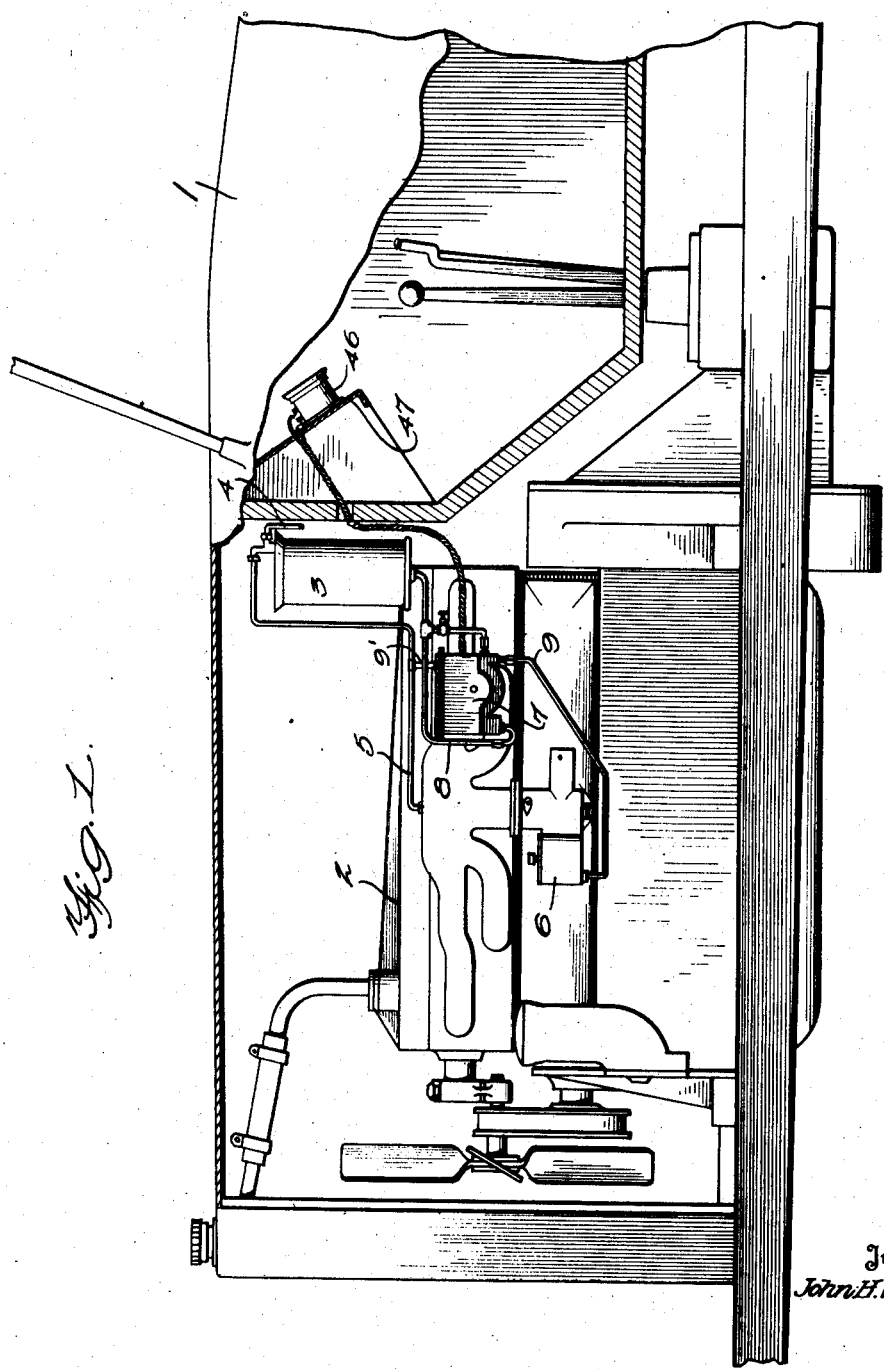

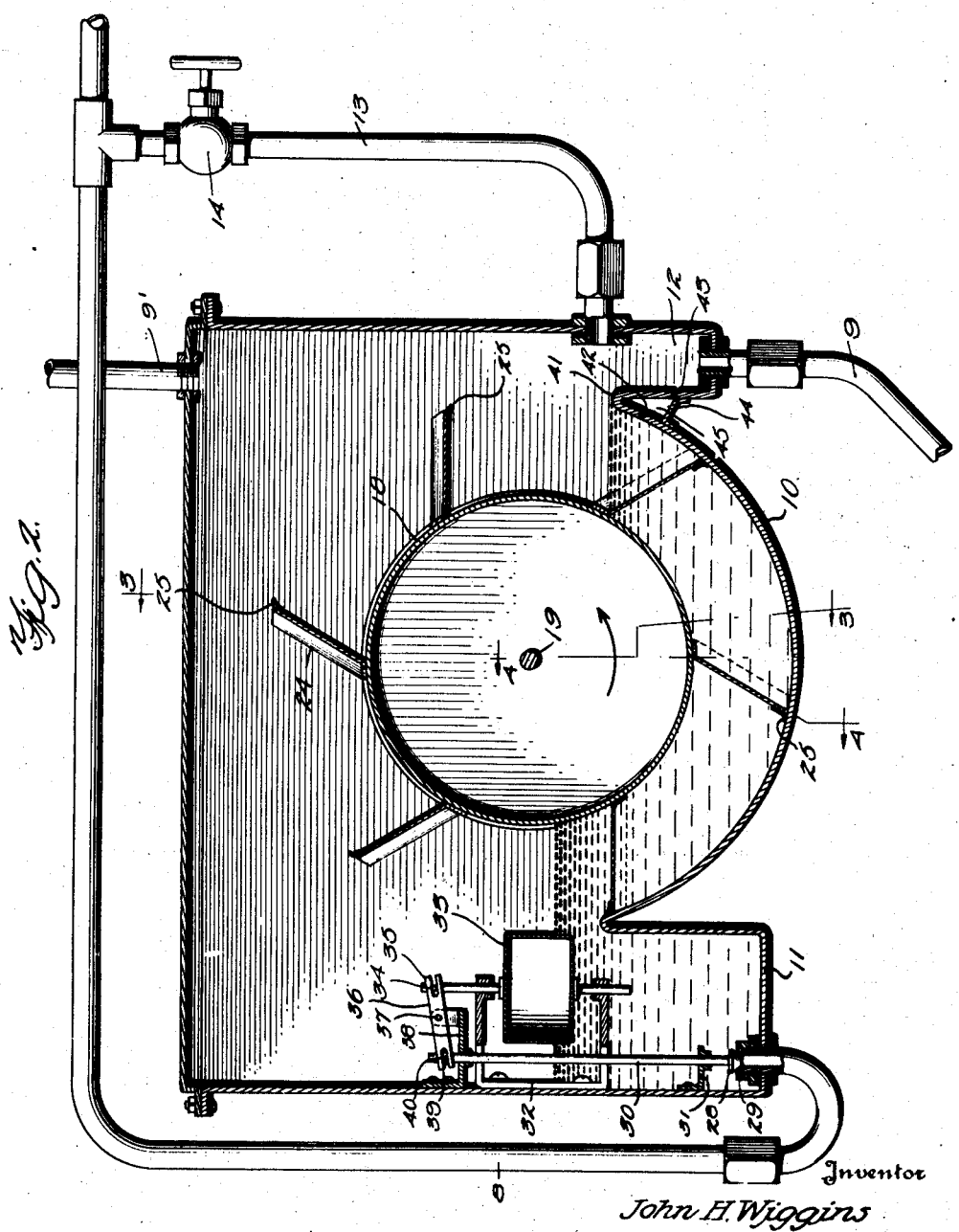

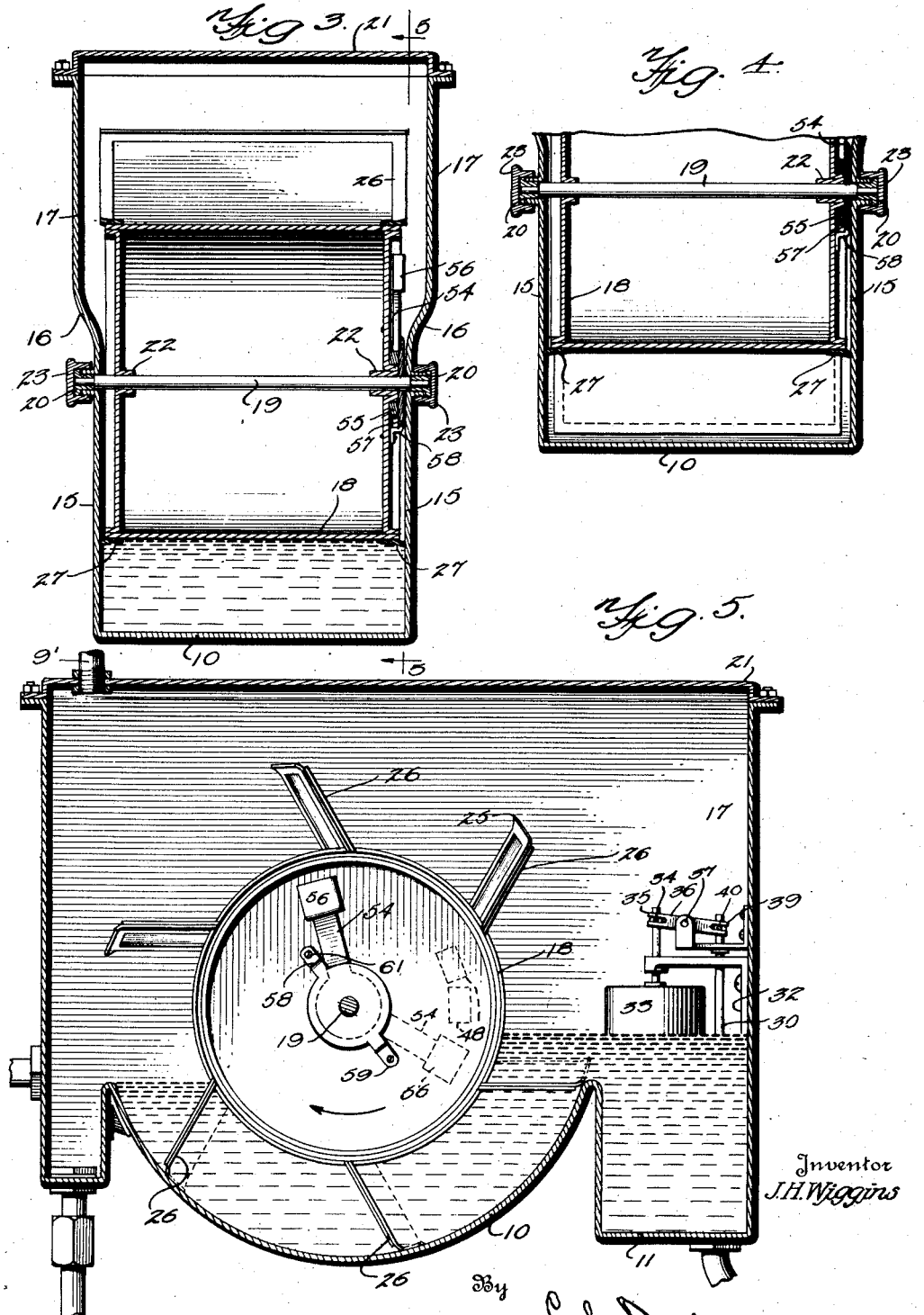

Patented May 8, 1928.

1,669,315

UNITED STATES PATENT OFFICE.

JOHN HENRY WIGGINS, OF BARTLESVILLE, OKLAHOMA.

METER.

Application filed May 31, 1922. Serial No. 564,855.

This invention relates to meters, and more particularly to liquid meters.

An object of the invention is the provision of means for measuring the flow of liquid in a system where pressure is not employed.

In the present invention, I provide a casing having a rotor therein adapted to be actuated by the flow of liquid through the casing, and means for registering the flow of liquid actuated by the rotation of the rotor.

The rotor is provided with paddles or blades which fit closely within the casing and it is preferably buoyant and mounted with its center or axis arranged above the liquid level. The construction of the rotor is such that friction is reduced to a minimum and the meter does not interfere with the uninterrupted flow of liquid in the system.

The meter casing is provided with an inlet opening and an outlet opening with the inlet arranged at a higher level than the outlet, whereby the liquid will flow by gravity due to the difference in static pressure at the inlet and outlet ends.

I further provide automatic means for controlling the amount of liquid in the meter casing at all times and preferably cut off the supply of liquid when the level at the inlet end exceeds a predetermined point.

Any suitable means may be employed for registering the flow of liquid, but I preferably employ an electrically actuated register having a pair of spaced contacts mounted in the meter casing and adapted to be bridged by the movable contact carried by the rotor whereby the circuit will be closed upon each revolution of the rotor and a record made thereof.

In the accompanying drawings, I have shown several embodiments of the invention. In this showing:

Figure 1 is a side elevation of a portion of a motor vehicle showing the invention applied thereto, parts being shown in section, Figure 2 is a vertical longitudinal sectional view of the meter casing when in operation, Figure 3 is a transverse sectional view on line 3—3 of Figure 2, Figure 4 is a similar view on line 4—4 of Figure 2, and Figure 5 is a vertical longitudinal sectional view on line 5—5 of Figure 3 when in operation.

Referring to Figure 1 of the drawings, the reference numeral 1 designates generally a motor vehicle having an engine 2. In the present instance, I have shown the engine equipped with the ordinary vacuum feed system comprising a vacuum tank 3 which is connected to the fuel supply (not shown) by means of a pipe 4. The fuel is drawn into the vacuum tank in the usual manner by suction existing in the tank and created through the medium of connecting pipe 5, connected to the intake manifold in the usual manner. The engine is provided with a carburetor 6.

A meter casing 7 is arranged between the carburetor and the vacuum tank, being connected to the vacuum tank by a pipe 8 and the carburetor by a pipe 9. The top of the meter casing is connected to the vacuum pipe 5 by a pipe 9'.

Referring to Figures 2 to 5 of the drawings, the meter casing comprises a substantially rectangular upper portion having a rounded extension 10 at the bottom and provided with a well 11 at the inlet end which is connected to the pipe 8, as shown. The casing is also provided with an outlet 12, connected to the pipe 9. As shown, a branch pipe 13 is connected to the pipe 8 and the meter outlet, and this pipe is provided with a normally closed valve 14. If the meter should get out of order or if the operator of the vehicle should prefer not to use the meter, the flow of fuel may be by-passed through the pipe 13 by opening the valve 14. The side walls 15 of the meter are substantially parallel and intermediate the top and bottom are provided with offset portions 16, whereby the upper portions 17 of the walls are spaced from each other a greater distance than the lower portions. A rotor 18 is arranged in the lower portion of the meter casing. As shown, the rotor consists of a hollow drum which is relatively light and buoyant. The rotor is mounted on a shaft 19 which is provided with substantially frictionless bearings 20, such as jewel bearings. In assembling the device, the top 21 of the casing is removed and the rotor lowered into the casing. The shaft is then passed through from one side, through bearing portion 22 of the shaft, and the bearings arranged upon its ends. Suitable caps 23 are then arranged on the opposite ends of the shaft over the bearings.

Blades 24 are secured to the periphery of the rotor in any suitable manner and extend outwardly therefrom. These blades are provided with packing 25 on their outer edges and similar packing 26 on their sides. The rotor is likewise provided with circumferential strips of packing 27 adapted to engage the sides of the casing in the lower portion of the meter casing. The size of the blades is such that the packing strip 25 will engage the curved lower wall 10 which is concentric with the axis of the rotor and the side strips of packing 26 will engage the side walls in the lower portion. By enlarging the upper portion of the meter casing transversely, friction between the packing strips 26 and the side walls is removed during one-half of the revolution of each blade, when the blade is in that portion of the casing where no liquid is present. It will be further noted from an inspection of Figures 2 and 5 of the drawings that the axis of the rotor is arranged above the liquid level further reducing friction and that the blades pass through the body of liquid only during a portion of their revolution.

The flow of liquid from the pipe 8 to the well 11 is controlled by a valve 28 engaging a valve seat 29 arranged on the end of the inlet pipe. This valve is provided with a valve stem 30 which passes upwardly through openings in suitable guides 31 and 32, secured to the wall of the casing. A float 33 is arranged in the well and this float is provided with a pin 34 adapted to be received in a slot 35 formed in the end of a lever 36. As shown, the lever is pivoted at 37 on a bracket 38, carried by the wall of the casing. The opposite end of the lever is provided with a slot 39 adapted to receive a pin 40, carried by the valve stem. The flow of liquid into the casing is adapted to be cut off approximately at the time when it reaches the level shown in Figures 2 and 5 of the drawings, and as this level is higher than the point 41, the top of the outlet opening, the liquid will flow by gravity through the meter to the outlet opening, revolving the rotor in the direction indicated by the arrow. The meter is arranged with its inlet end toward the front of the vehicle, as shown in Figure 1 of the drawings, and when the vehicle is traveling up-hill, the inlet end will be higher than the outlet end so that a free flow of fuel to the carburetor is assured. When traveling down-hill, less fuel will be necessary, but to insure a sufficient supply of fuel, there is provided a pair of openings 42 and 43 in the curved wall 10 and in the outlet 12 respectively, which permit fuel to pass to the pipe 9, even though the level of fuel at the outlet end of the meter should be below the point 41. One of these openings is relatively small, whereby the flow of fuel is restricted and flooding of the carburetor is prevented. As shown, a plate 44 is arranged beneath these openings, forming a chamber 45 through which the fuel passes.

As stated, any suitable means may be employed for registering the revolutions of the rotor and thus registering the consumption of fuel. The amount of fuel which must be fed through the meter casing to cause a complete revolution of the rotor may be computed and the meter is preferably dimensioned and designed to make a revolution for each unit of fuel passing therethrough. The registering mechanism 46 may be mounted on the instrument board 47 of the vehicle near the driver's seat to permit inspection at all times.

In operation, fuel is drawn from the fuel supply (not shown) through the vacuum tank 3 in the usual manner. Thence it passes through pipe 8 to the meter casing, through the meter casing and pipe 9 to the carburetor 6. If the meter should be out of order, or if the operator of the vehicle desires to disconnect the meter for any reason, the valve 14 is opened and the fuel is by-passed through the pipe 13 to the outlet 12 of the meter. The level of the fuel in the meter is controlled by float 33. When the level rises, the float swings the lever 36 on its pivot and closes valve 29. When the level of fuel at the inlet end of the meter is lower than the point 41 at the outlet end of the meter, the valve is open, and fuel flows through the meter by gravity. The blades 24 snugly engage the bottom 10 of the curved portion of the meter casing and the side walls 15 and the rotor 18 is thus revolved by the passage of fuel through the meter casing. As stated, when the vehicle is traveling down-hill and the level of fuel has a tendency to lower at the outlet end of the meter below the point 41, sufficient fuel to keep the engine running with the light load on it will pass through the chamber 44 to the pipe 9, through openings 42 and 43. The rotor is arranged to pass through the fuel only during a portion of its revolution, the fuel level being controlled as described and the axis of the rotor being arranged above the fuel level. This reduces friction and at the same time, submerges sufficient of the rotor to always have two blades in the fuel so that the rotor will be revolved. The rotor is mounted on jewel bearings as described, to reduce friction and the upper portion of the meter casing is widened to remove unnecessary contact between the packing strips 26 and 27 and the wide walls of the casing. The blades 25 are arranged at an angle, as shown in Figure 5 of the drawings, so that the entire surface of the blade is not disengaged from contact with the surface 10 as it passes the point 41 at the same instant. This would tend to create a vacuum which may interfere with the accurate operation of the meter, but by inclining the blades, one edge of the blade reaches the point 41 before the other edge and the blade gradually passes this point.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

I claim:

1. The combination with an internal combustion engine including an intake manifold, of a meter casing, inlet and outlet conduits connected to said casing, said inlet conduit being connected to a source of fuel supply, an inlet valve controlling passage of fuel through said inlet conduit, a rotor mounted in said casing and dividing it into an inlet side and an outlet side, a register connected to said rotor, a float controlling said inlet valve to maintain the level of the fuel in the inlet side of said casing higher than the level in the outlet side, and a conduit establishing communication between the intake manifold of the engine and the interior of said casing above the level of the fuel therein.

2. A meter for determining fuel consumption of internal combustion engines comprising a casing adapted to be arranged in the fuel feed line, said casing having parallel side walls and a bottom wall provided with a curved portion and being provided with an inlet opening and an outlet opening, an automatic valve arranged in said inlet opening to maintain a substantially constant liquid level, a rotor comprising a hollow drum rotatably mounted in said casing, blades carried by said rotor, packing arranged on the outer edges of said blades and adapted to engage the curved portion of the bottom of the meter casing, and packing arranged on the sides of said blades and adapted to engage the side walls of the casing.

In testimony whereof, I affix my signature.

JOHN HENRY WIGGINS.